(12) United States Patent
Shin

(10) Patent No.: US 11,890,786 B2
(45) Date of Patent: Feb. 6, 2024

(54) METHODS AND SYSTEMS FOR FACILITATING POLLUTION-FREE TIRE RECYCLING PROCESSES

(71) Applicant: David Max Shin, Dallas, TX (US)

(72) Inventor: David Max Shin, Dallas, TX (US)

(*) Notice: Subject to any disclaimer, the term of this patent is extended or adjusted under 35 U.S.C. 154(b) by 0 days.

(21) Appl. No.: 18/183,017

(22) Filed: Mar. 13, 2023

(65) Prior Publication Data
US 2023/0294332 A1    Sep. 21, 2023

Related U.S. Application Data

(60) Provisional application No. 63/320,094, filed on Mar. 15, 2022.

(51) Int. Cl.
| | |
|---|---|
| *B02C 19/00* | (2006.01) |
| *B29B 17/04* | (2006.01) |
| *B29B 17/02* | (2006.01) |
| *B03B 9/06* | (2006.01) |
| *B02C 19/18* | (2006.01) |
| *B02C 23/14* | (2006.01) |
| *B02C 23/16* | (2006.01) |
| *B02C 23/20* | (2006.01) |
| *B02C 23/38* | (2006.01) |

(52) U.S. Cl.
CPC ........ *B29B 17/0412* (2013.01); *B02C 19/186* (2013.01); *B02C 23/14* (2013.01); *B02C 23/16* (2013.01); *B02C 23/20* (2013.01); *B02C 23/38* (2013.01); *B03B 9/06* (2013.01); *B29B 17/02* (2013.01); *B29B 2017/0224* (2013.01); *B29B 2017/0272* (2013.01); *B29B 2017/0488* (2013.01)

(58) Field of Classification Search
CPC ......... B02C 23/38; B02C 23/14; B02C 23/16; B02C 23/20; B02C 19/186
USPC .................................................. 241/DIG. 37
See application file for complete search history.

(56) References Cited

U.S. PATENT DOCUMENTS

| | | | | |
|---|---|---|---|---|
| 2,836,368 A | * | 5/1958 | Mccoy | A23L 3/44 99/496 |
| 3,885,744 A | * | 5/1975 | Drage | B03B 9/061 241/23 |
| 4,025,990 A | * | 5/1977 | Lovette, Jr. | B29B 17/0408 241/DIG. 31 |
| 4,863,106 A | | 9/1989 | Perkel | |
| 5,115,983 A | | 5/1992 | Rutherford, Sr. | |
| 5,264,640 A | * | 11/1993 | Platz | C07C 4/22 264/912 |
| 5,385,307 A | * | 1/1995 | Azar | F25D 3/11 241/DIG. 31 |

(Continued)

FOREIGN PATENT DOCUMENTS

JP    H11507607 A * 7/1999 ............. B29B 17/00

*Primary Examiner* — Faye Francis

(57) ABSTRACT

A system and method for freezing and breaking down tires or other materials is disclosed. The system and method for freezing and breaking down tires includes using a shredder to shred the tires, using a filter to screen the tire shreds, using a water sprayer to rinse the tire shreds, using a freezing tunnel to freeze the tire shreds before they are crushed into tire grains, using a magnet to remove any metallic fibers, filtering out any oversized tire grains for re-freezing and re-crushing, and using a separator to separate out any oversized or undersized pieces before bagging the final tire grains for re-use and recycling.

3 Claims, 5 Drawing Sheets

(56) References Cited

U.S. PATENT DOCUMENTS

| | | | | |
|---|---|---|---|---|
| 5,524,838 A | * | 6/1996 | Ellers | B02C 18/14 |
| | | | | 241/DIG. 31 |
| 5,588,600 A | * | 12/1996 | Perfido | B29B 17/02 |
| | | | | 241/DIG. 31 |
| 5,590,838 A | | 1/1997 | Brewer | |
| 5,634,599 A | * | 6/1997 | Khais | B03B 9/061 |
| | | | | 241/DIG. 31 |
| 5,735,471 A | * | 4/1998 | Muro | B29B 17/0206 |
| | | | | 241/DIG. 31 |
| 7,093,781 B2 | * | 8/2006 | Meckert | B29B 17/0408 |
| | | | | 241/DIG. 31 |
| 2002/0144933 A1 | * | 10/2002 | Detampel | B02C 21/00 |
| | | | | 209/3 |
| 2020/0208368 A1 | * | 7/2020 | Milanovich | E02B 15/10 |

* cited by examiner

METHODS AND SYSTEMS FOR FACILITATING POLLUTION-FREE TIRE RECYCLING PROCESSES

FIELD OF THE INVENTION

The present invention relates generally to the field of disposal of solid waste. More specifically, the present invention is methods and systems for facilitating pollution-free tire recycling processes.

BACKGROUND OF THE INVENTION

The field of disposal of solid waste is technologically important to several industries, business organizations and/or individuals. In particular, the use of solid waste disposal is prevalent for rubber industries, chemical industries, etc.

Existing techniques for disposing of old tires are deficient with regard to several aspects. Currently, tires are broken down by shredding and using immense temperatures which causes a high amount of pollution within the environment. The use of high temperatures greatly reduces the quality of the broken down tire grains which reduces the value (tires already go through an amount of great heat which causes tires to become unusable). The use of high temperatures also produces a great amount of odor and various hazardous clouds of dust from the used tires.

Therefore, there is a need for improved methods and systems for facilitating pollution-free tire recycling processes that may overcome one or more of the above-mentioned problems and/or limitations. The present disclosure describes methods and systems for facilitating pollution-free tire recycling processes. The system may provide tire recycling solutions using cryogenic freezing as the main method to recycle tires. Further, breaking down the recycled tires into smaller tire shreds and grains may be used in a variety of ways by the public and government sectors such as construction, home repair, fuel, and as well as other applications. Tire recycling may be needed in some of the following areas: waterproofing roofs from leaks, rubber asphalt, mixing with plastics to create various items, new tires, new hosiery, and children's playgrounds. Further, tire recycling may be needed as tire piles lay home to disease-ridden pests. Recycled tires may further be used as artificial turf recycled tire grains may be used to create asphalt for roads. The various methods of re-use have been used over the past 22 years in the United States. Cryogenic freezing and processing of tires results in a greener process with a higher productivity rate and may be 99.9% pollution-free. Thus, the present invention aims to solve the existing need for tire recycling using a system and method that increases productivity and reduces pollution and other health risks.

SUMMARY

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

According to some embodiments, a method for facilitating nitrogen tire recycling is disclosed. Further, the method may include a step of placing a plurality of tires on a conveyor belt. Further, the conveyor belt may be configured for moving the plurality of tires. Further, the method may include a step of shredding, using a shredder, the plurality of tires. Further, the shredder may be configured for shredding the plurality of tires into a plurality of tire shreds. Further, the method may include a step of spraying, using high pressurized water, the plurality of tire shreds. Further, the method may include a step of filtering, using a filter, the plurality of tire shreds. Further, the filter may be configured to filter out a plurality of oversized chips among the plurality of tire shreds. Further, the plurality of oversized chips may be sent back for the step of shredding. Further, the method may include a step of blow drying, using a fan, the plurality of tire shreds. Further, the method may include a step of freezing, using a freezer, the plurality of tire shreds. Further, the freezer may be configured for freezing the plurality of tire shreds to a temperature range of $-150°$ C. to $-300°$ C., though other temperatures below freezing are contemplated. Further, the method may include a step of crushing, using a hammer mill, the plurality of tire shreds after the freezing. Further, the method may include a step of separating, using a gravity separator, a plurality of metallic fibers of the plurality of tire shreds and a plurality of tire grains of the plurality of tire shreds. Further, the method may include a step of re-crushing, using a crushing machine, the plurality of tire grains into a plurality of fine tire particles. Further, the plurality of fine tire particles may not be pure and may include a plurality of oversized tire particles. Further, the method may include a step of cyclone separating, using a cyclone separator, the plurality of fine tire particles, and the plurality of oversized tire particles. Further, the plurality of oversized tire particles may again go through the separating and the re-crushing before going through the cyclone separating again. Further, the method may include a step of screening, using a screener, the plurality of fine tire particles. Further, after the screening, the plurality of fine tire particles may be ready to be bagged as a product. The bagging process may be performed manually or by using an auto-bagging mechanism.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAIL DESCRIPTIONS OF THE INVENTION

Figure 1:
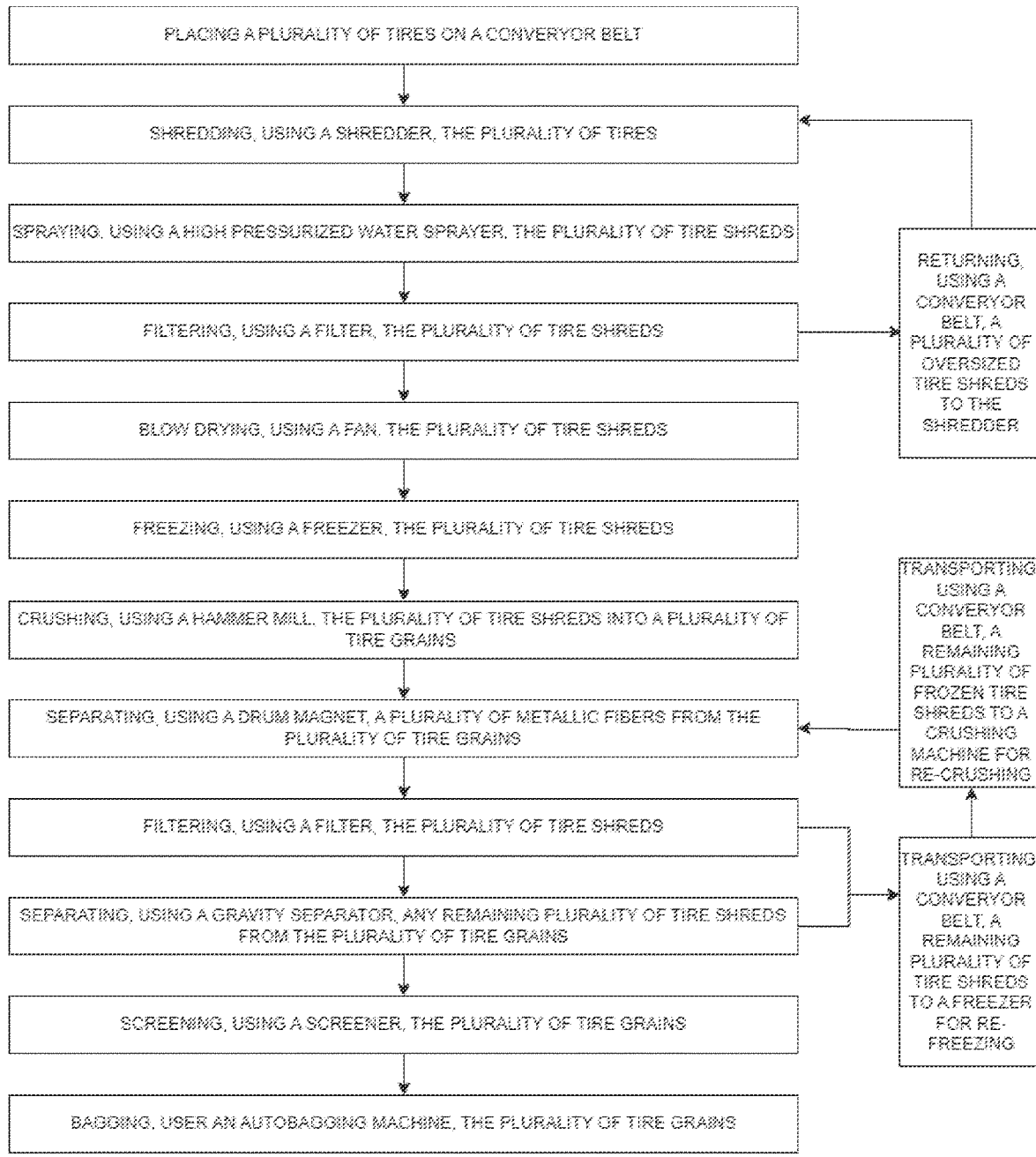
FIG. 1 is a flowchart of a method for facilitating nitrogen tire recycling, in accordance with some embodiments.
Figure 2:
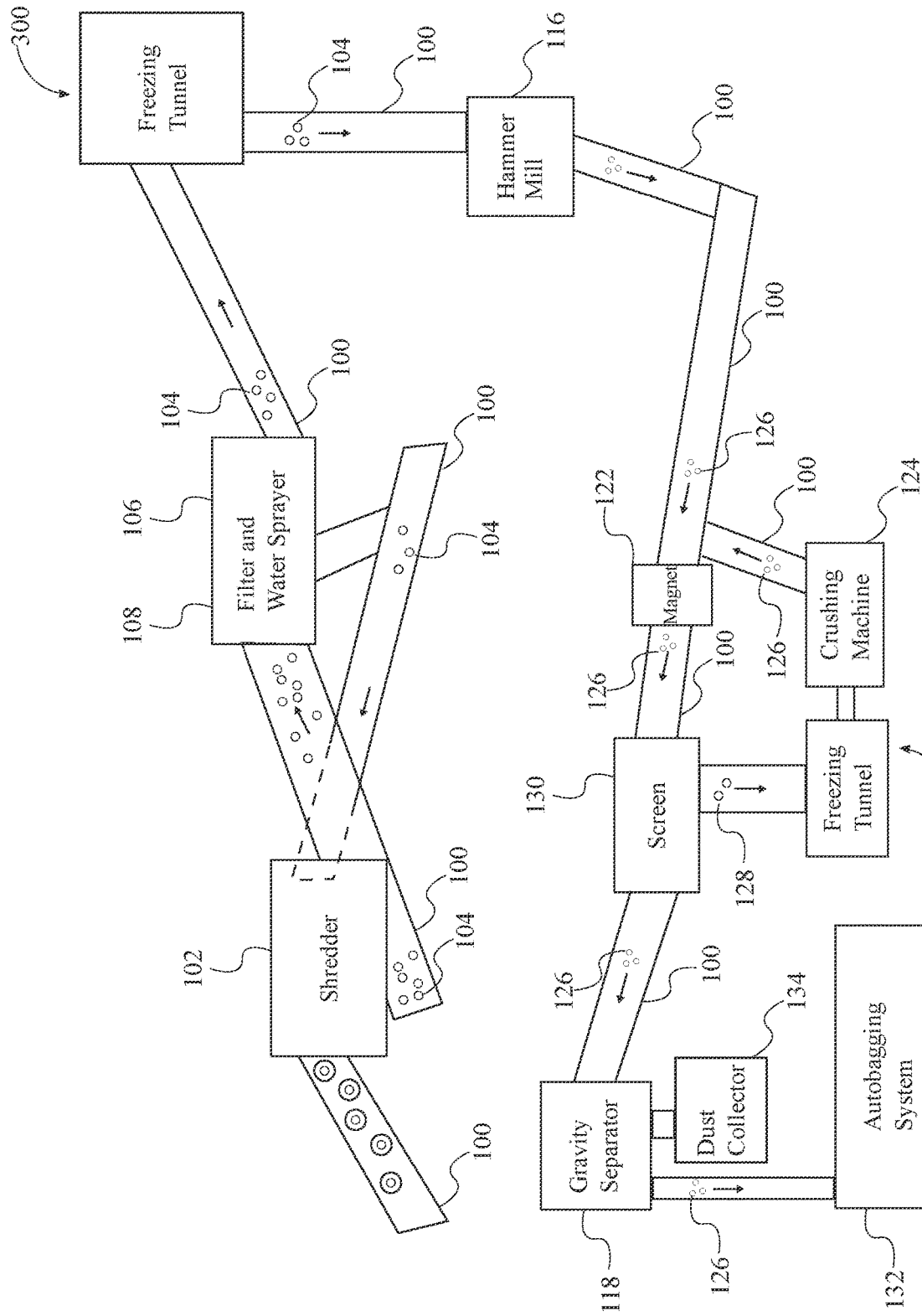
FIG. 2 is a schematic of a system for facilitating recycling of a plurality of tires, in accordance with some embodiments.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of methods and systems for facilitating pollution-free tire recycling processes, embodiments of the present disclosure are not limited to use only in this context.

Unless otherwise specified, it should be construed that in any method or system listed, the method of transport between steps comprises the use of conveyor belts to transport any constituent materials between the various steps, machines, and methods involved in the present invention.

The following paragraphs are intended to provide a brief overview of the invention without reference to the figures. The invention is described in greater detail with reference to the figures further herein.

Overview

The present invention is a system of method for recycling tires that comprises a plurality of tunnel-style conveyor belts of about 2-3 inches wide. The tires may first be placed onto one of the plurality of conveyor belts 100. The conveyor belt may transport the tires to a shredder 102, ideally comprising a Model HS-150 Tire Shredder 102, where the tires are turned into a plurality of tire shreds 104. The plurality of tire shreds 104 is then sprayed with high-pressure water, then blow-dried using a fan 112. In some cases, a plurality of oversized tire chips may remain after the shredding process. The plurality of oversized tire chips may be filtered out using a filter 108, ideally the filter 108 comprising a Model-4555 Disc Screen and returned to the shredder 102 using a conveyor belt of the plurality of conveyor belts 100 for re-shredding. After this, the plurality of tire shreds 104 may be frozen in a cryogenic freezing tunnel 300. After freezing, the tires may be broken down into a plurality of tire grains 126 using hammer mill 116, the hammer mill 116 being an industrial hammer or MS-40-UR Hammermill in the ideal embodiment. The process of cryogenic freezing can reduce odor and remove hazardous dust from the used tires.

The plurality of tire grains 126 are then passed under a drum magnet 122 wheel to separate out any metallic fibers. At this point, the plurality of tire grains 126 are re-crushed using a crushing machine 124, the crushing machine 124 ideally being a 24"×21"×32" Crackermill 150 H.P. Once re-crushed, the plurality of tire grains 126 are crushed into a plurality of tire grains. In some situations, some of the plurality of tire grains may still be too large, being a plurality of oversized tire shreds 110. The plurality of oversized tire shreds 110 may be separated out using a cyclone or gravity separator 118. The separator 118 will deposit the plurality of oversize tired shreds onto a conveyor belt, where they are transported for re-freezing and re-crushing. The plurality of tire grains are then transported to a screener 130, where any of the plurality of tire grains that are too small or too large may either be disposed of or transported to an earlier step in the system and process for re-processing.

Now in reference to the specifics of the system and method in reference to the figures, FIG. 1 is a flowchart of a method for facilitating nitrogen tire recycling, in accordance with some embodiments.

First, the method may comprise a step of placing a plurality of tires on a conveyor belt of the plurality of conveyor belts 100. Further, the plurality of conveyor belts 100 may be configured for moving the plurality of tires between the various steps and components of the system and method. The conveyor belt may lead the plurality of tires into a shredder 102. The tires may be placed on the plurality of conveyor belts 100 either manually or by some form of automation.

Further, the method may comprise a step of shredding, using the shredder 102, the plurality of tires. The shredder 102 may be configured for shredding the plurality of tires into a plurality of tire shreds 104. Further, in the ideal embodiment the shredder 102 may comprise a model HS-150 tire shredder 102.

The method may further comprise a step of spraying, using a high pressurized water sprayer 106, the plurality of tire shreds 104. This cleans the plurality of tire shreds 104 and helps remove dust and debris.

Further, the method may comprise a step of filtering, using a filter 108, the plurality of tire shreds 104. Further, the filter 108 may be configured to sort out a plurality of oversized tire shreds 110 from the plurality of tire shreds 104. In some embodiments, the plurality of oversized tire shreds 110 may be bigger than two inches, though any size may be designated to be too large or too small for further processing. Further, the plurality of oversized tire shreds 110 may be sent back for the step of shredding, by transporting the with a conveyor belt to the shredder 102. Further, in the ideal embodiment, the filter 108 may comprise a model-4555 disc screen.

Further, the method may comprise a step of blow drying, using a fan 112, the plurality of tire shreds 104. During this step, any excess water is removed by blow drying the plurality of tire shreds 104 with the fan 112, to ensure they are properly dried before they proceed to a step of freezing.

Further, the method may comprise a step of freezing, using a freezer 302, the plurality of tire shreds 104. Further, in the ideal embodiment, the freezer 302 may be configured for freezing the plurality of tire shreds 104 to a temperature range of −150° C. to −300° C. Further, in the ideal embodiment, the freezer 302 may comprise a freezing tunnel 300, ideally a Messer Nitrogen Freezing tunnel 300 or similar.

Further, the method may comprise a step of crushing, using a hammer mill 116, the plurality of tire shreds 104 after the freezing, transforming the plurality of tire shreds 104 into a plurality of tire grains 126. Further, in the ideal embodiment, the hammer mill 116 may comprise a Model MS-40-UR Hammermill. In the ideal embodiment, the plurality of tire grains 126 comprise 40-mesh rubber granules that are produced by the hammer mill 116 after crushing. This step works hand-in-hand with the step of freezing, using the freezing tunnel 300, the plurality of tire shreds 104. The freezing tunnel 300 minimizes the levels of heat and prevents pollution from emanating during the use of the hammer mill 116.

Further, in some embodiments, the method may comprise a step of separating, using a drum magnet 122, a plurality of metallic fibers from the plurality of tire grains 126. This removes any metallic impurities from the plurality of tire grains 126.

Further, the method may comprise a step of separating, using a gravity separator 118, a plurality of oversized tire shreds 110 from the plurality of tire grains 126. This ensures all of the plurality of tire grains 126 are of the appropriate size to proceed. Further, in the ideal embodiment, the gravity separator 118 may comprise a Gravity Separator 118 Model 14/16HA Fan 112. Any remaining tire shreds of the plurality of tire shreds 104 go through go through the gravity separator 118 model 14/16HA Fan 112. The plurality of tire grains 126 continue to a cyclone separator 118, while the plurality of oversized tire shreds 110 proceed to a step of re-crushing.

Further, the method may comprise a step of re-freezing, using a freezer 302, the plurality of oversized tire shreds 110 before re-crushing. Further, in the ideal embodiment, the freezer 302 may be configured for freezing the plurality of tire shreds 104 to a temperature range of −150° C. to −300° C. Further, in the ideal embodiment, the freezer 302 may include a Messer Nitrogen Freezing tunnel 300.

Further, the method may comprise a step of re-crushing, using a crushing machine 124, the plurality of oversized tire shreds 110 into a plurality of tire grains 126. Further, the plurality of tire grains 126 may not be pure and may include a plurality of oversized tire grains 128. Further, in the ideal embodiment, the crushing machine 124 may comprise a 24"×21"×32" Crackermill 150 H.P.

Further, the method may comprise a step of separating, using a cyclone separator 118, the plurality of tire grains 126 and the plurality of oversized tire grains 128. Further, the plurality of oversized tire grains 128 may again go through the step of separating and the step of re-crushing before going through the step of cyclone separating again.

Further, the method may comprise a step of screening, using a screener 130, the plurality of tire grains 126. Further, in some embodiments, the plurality of tire grains 126 may be screened through a Screener 130 40 Mesh Minus 8400×60/12HA Fan 112. Any grains that are too small or too large may either be disposed of or returned to some other point in a method using a conveyor belt for further processing. Further, after the screening, the plurality of tire grains 126 may be ready to be bagged as a product.

Further, in the ideal embodiment, the method may comprise a step of bagging, using an autobagging machine 132, the plurality of tire grains 126. The autobagging machine 132 may be configured to automatically place the plurality of tire grains 126 into appropriate bags for future transport and storage.

Figure 3:
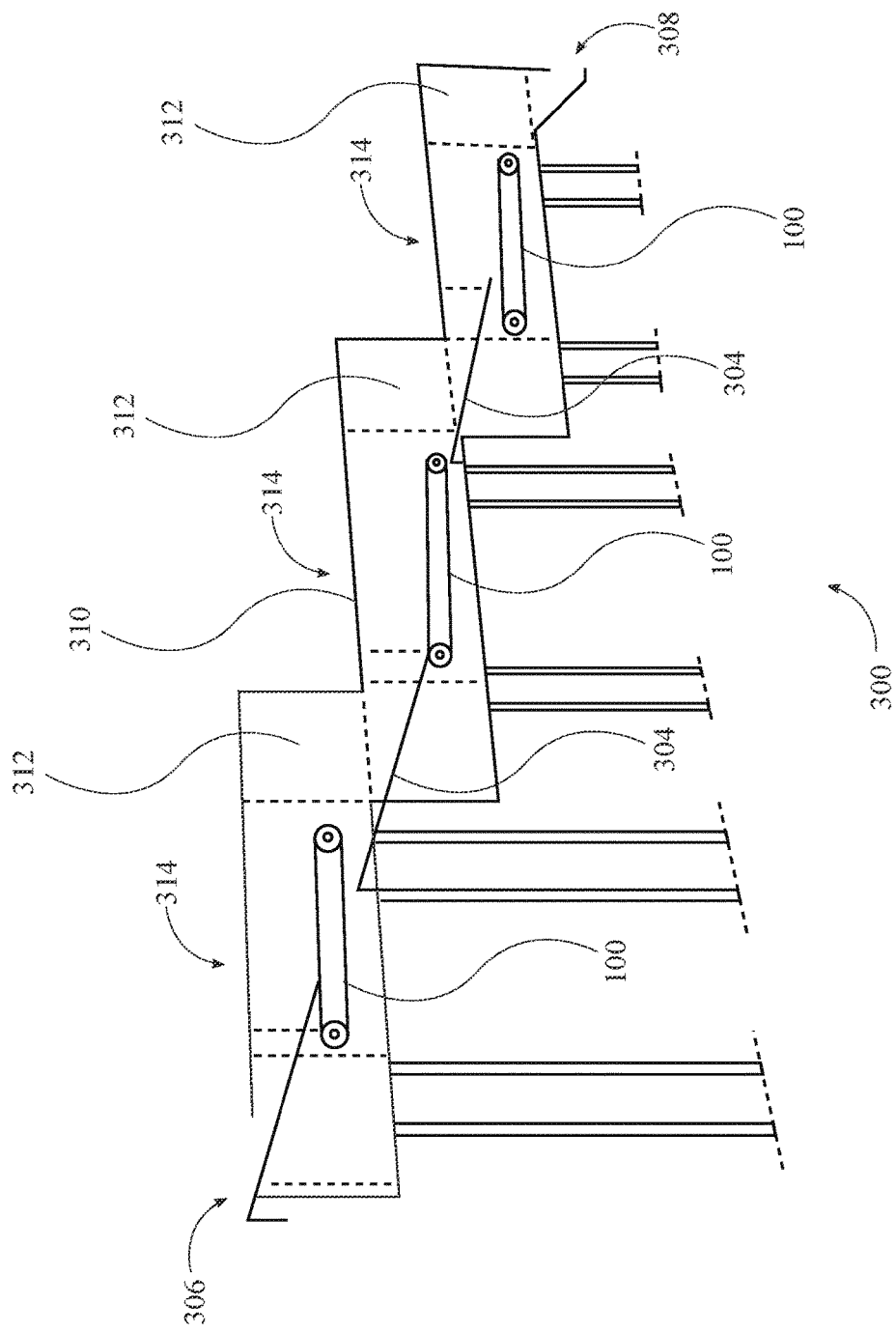
FIG. 3 is a exemplary embodiment of the freezing tunnel.
Figure 4:
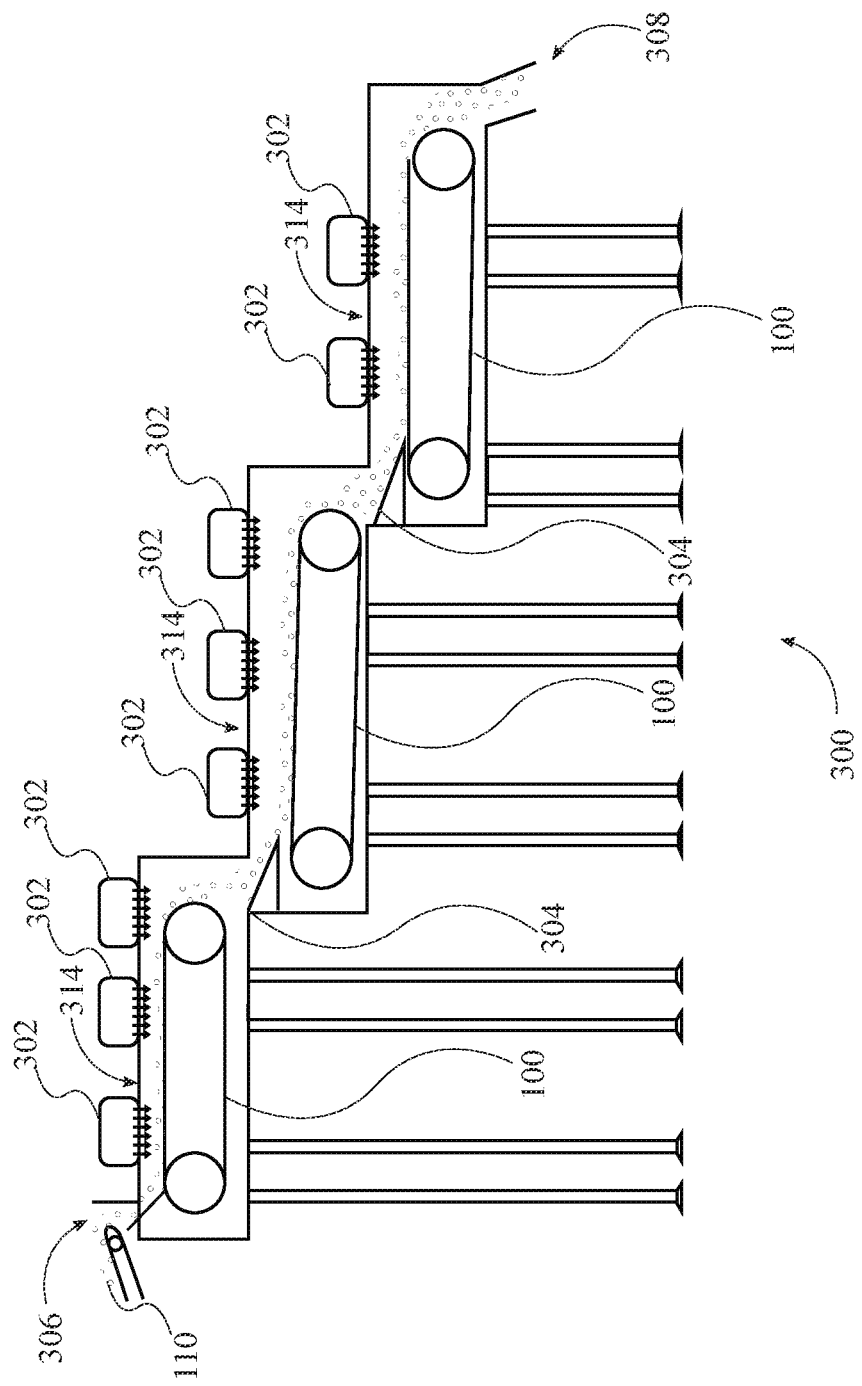
FIG. 4 is an exemplary embodiment of the freezing tunnel in a state of use to freeze a plurality of oversized tire shreds.
Figure 5:
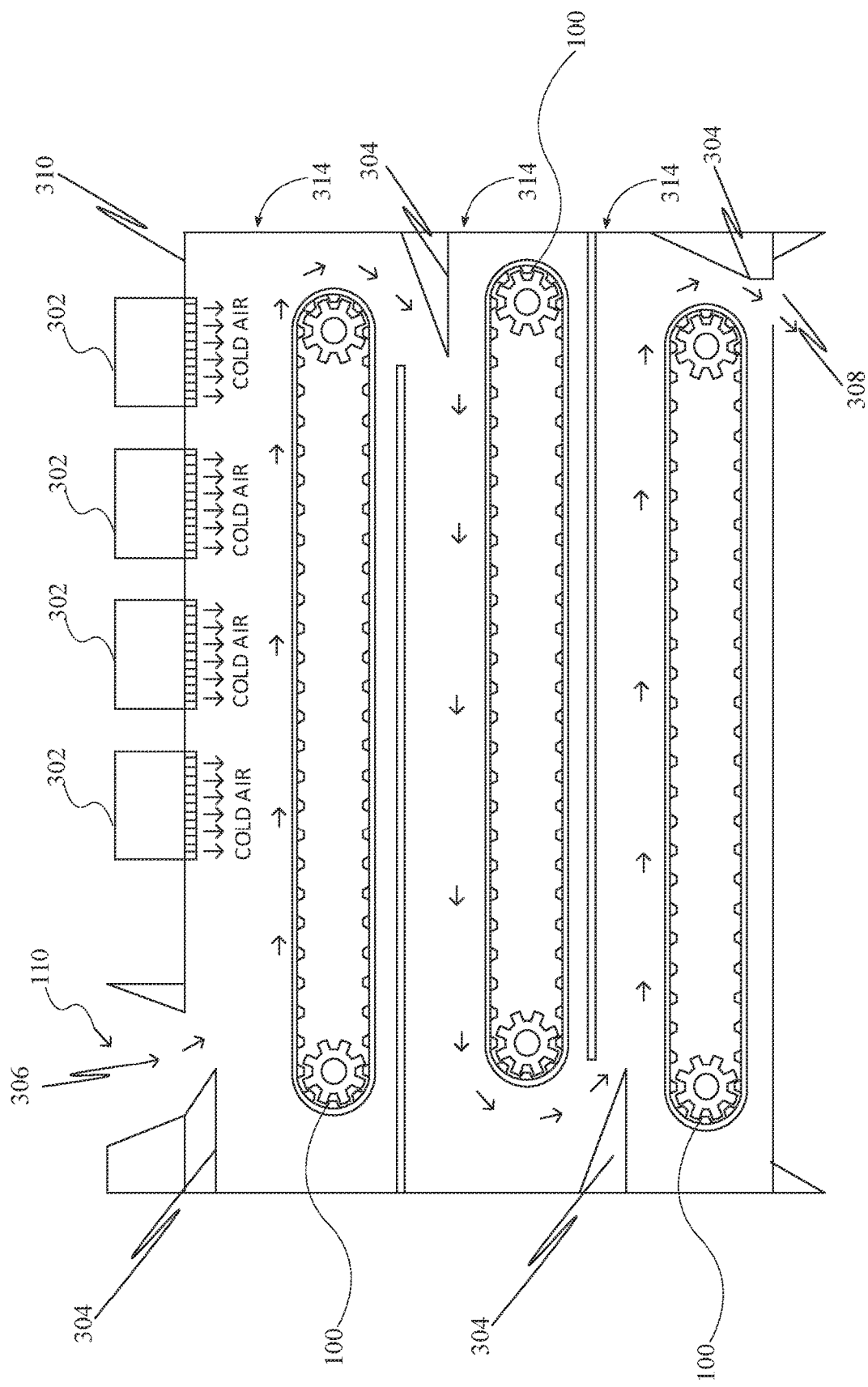
FIG. 5 is an exemplary embodiment of the freezing tonnel in a state of use to freeze a plurality of oversized tire shreds.

FIGS. 3-5 show a schematic of a freezing tunnel 300 for facilitating freezing of a plurality of tires, tire shreds, or tire grains, in accordance with some embodiments.

Further, the freezing tunnel 300 may comprise a plurality of freezers 302, a plurality of conveyor belts 100, a plurality of guides 304, a feed opening 306, a discharge opening 308, and a freezer housing 310. The plurality of freezers 302 may be configured for lowering the temperature of the freezing tunnel 300 by supplying cold air. The plurality of freezers 302 may be disposed inside the freezer housing 310. The feed opening 306 may be configured for providing an entrance for any tire chips, shreds, or grains to enter the freezing tunnel 300. In the ideal embodiment, the size of any tire material entering the freezing tunnel 300 should be around two inches, though any size is of tire material is considered within the spirit and scope of the present invention.

Further, some of the plurality of conveyor belts 100 may be disposed inside the freezer housing 310. Further, the plurality of conveyor belts 100 may be configured for moving the plurality of tire chips inside the freezing tunnel 300. Further, the plurality of guides 304 may be disposed inside the freezer 302 housing. Further, the plurality of guides 304 may be configured for providing directions to the plurality of tire materials in movement and preventing them from falling off the plurality of conveyor belts 100. Further, the discharge opening 308 may be configured for providing exit to the plurality of tire chips to move out of the freezing tunnel 300. In one embodiment, the freezing tunnel 300 may be divided into a plurality of chambers 314. Each of the plurality of chambers 314 may have a door 312 that separates each of the plurality of chambers 314 from the rest of the plurality of chambers 314. The door 312 may provide a seal such that each of the plurality of chambers 314 is frozen independently from the rest of the freezing tunnel 300. In the ideal embodiment, the freezing tunnel 300 is fully automated and integrated into the process described in FIG. 1, above. Thus, a user need not manually turn on the machine, turn off the machine, or manually check or spray the tire pieces when used with the invention. In the ideal embodiment, the feed opening 306 and discharge opening 308 are sealed tight for twenty minutes during the nitrogen freezing process. In some embodiments, the freezing tunnel 300 may be powered by an external source, such as by placing a plurality of solar panels on the roof of the structure, or the roof of the freezing tunnel 300 itself.

Although the invention has been explained in relation to its preferred embodiment, it is to be understood that many other possible modifications and variations can be made without departing from the spirit and scope of the invention.

What is claimed is:

1. A system for converting tires into tire grains, the system comprising:
   a plurality of conveyor belts;
   a shredder to shred a plurality of tires into a plurality of tire shreds;
   a water sprayer to spray the plurality of tire shreds with highly pressurized water;
   a filter to filter out a plurality of oversized tire shreds;
   a fan to blow dry the plurality of tire shreds;
   a freezer to freeze the plurality of tire shreds;
   wherein the freezer freezes the plurality of tire shreds to a temperature between of −150° C. to −300° C.;
   a hammer mill crushes the plurality of tire shreds into a plurality of tire grains;
   a separator separates out a plurality of oversized tire grains from the plurality of tire grains;
   a magnet separates out a plurality of metallic fibers from the plurality of tire grains;
   a crushing machine crushes the plurality of oversized tire grains;
   a screener separates out any of the plurality of tire grains that are above or below a designated size;
   an autobagger; and
   wherein the plurality of conveyor belts carries the plurality of tires, plurality of tire shreds, plurality of tire grains, and plurality of oversized tire grains between the components of the system for converting tires into tire grains.

2. The system of claim 1, further comprising:
   the freezer further comprising a freezing tunnel; and
   the freezing tunnel comprising a plurality of freezers, a plurality of guides, a feed opening; a discharge opening; and a freezer housing.

3. The system of claim 2, further comprising:
   wherein the freezing tunnel further comprising a plurality of chambers and a plurality of doors; and
   wherein the plurality of doors are positioned to separate each of the plurality of chambers.

* * * * *